United States Patent [19]
Grosjean

[11] 3,821,649
[45] June 28, 1974

[54] SIGNAL STRENGTH METER CIRCUITRY

[75] Inventor: Jon Paul Grosjean, Obereschach, Germany

[73] Assignee: GTE Sylvania Incorporated, Seneca Falls, N.Y.

[22] Filed: Feb. 15, 1973

[21] Appl. No.: 332,635

[52] U.S. Cl............... 325/398, 179/15 BT, 325/364
[51] Int. Cl. ............................................ H04b 1/16
[58] Field of Search .......... 179/15 BT; 325/67, 363, 325/364, 398, 404, 410, 414

[56] References Cited
UNITED STATES PATENTS

| | | |
|---|---|---|
| 2,489,248 | 11/1949 | Abraham ............................ 325/364 |
| 3,525,045 | 8/1970 | Recklinghausen .................. 325/348 |
| 3,673,499 | 6/1972 | Avins et al. ......................... 325/364 |

Primary Examiner—Albert J. Mayer
Attorney, Agent, or Firm—Norman J. O'Malley; Thomas H. Buffton; Cyril A. Krenzer

[57] ABSTRACT

A signal receiver having connected IF amplifier and detector stages includes a signal strength meter circuit wherein a fixed potential provides a given meter deflection, IF signals derived from received signals above a given level increase the meter deflection, and detected signals representative of noise derived from received signals below a given level decrease the meter deflection whereby the range of meter deflection representing signal strength variations is increased.

11 Claims, 2 Drawing Figures

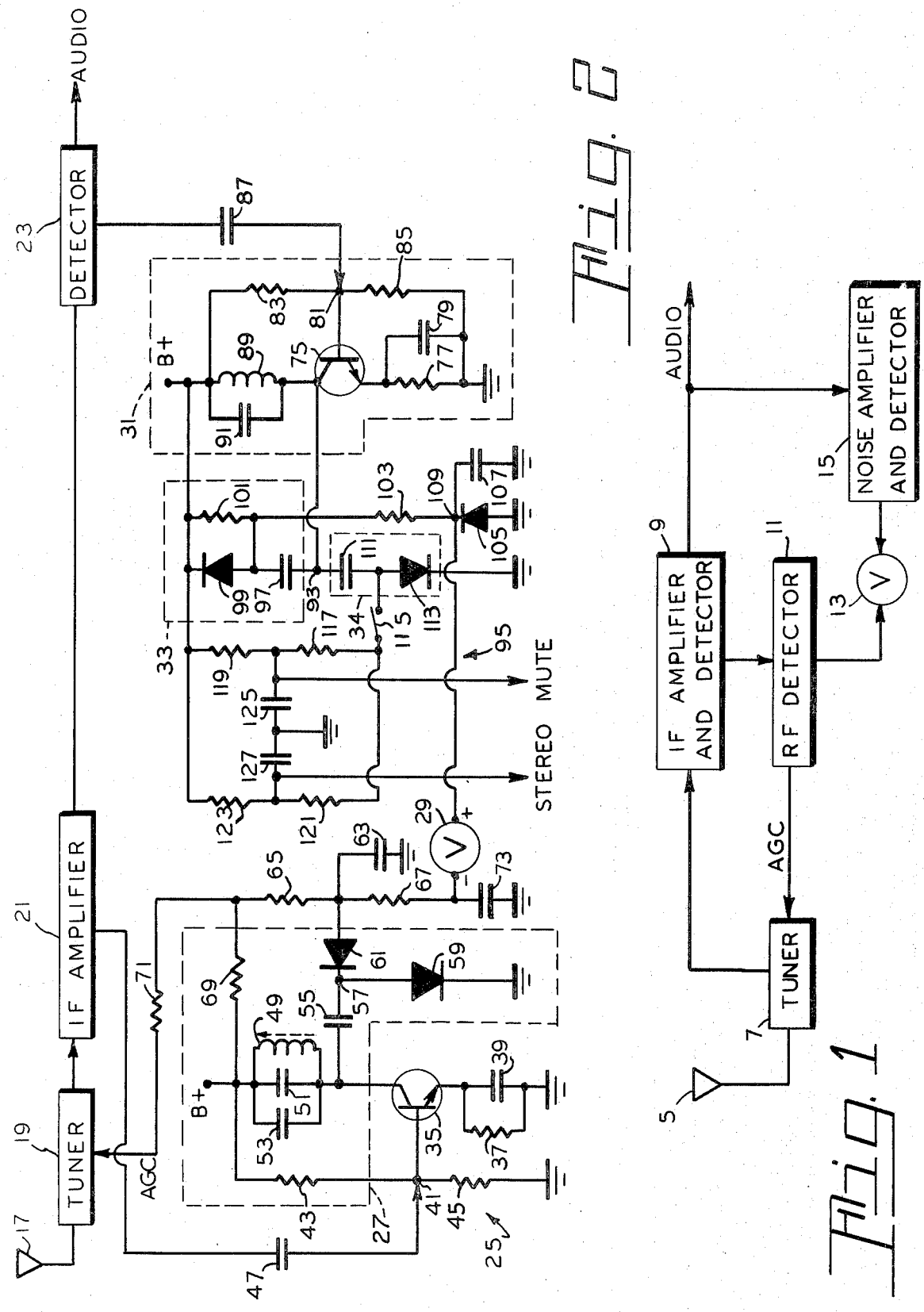

SIGNAL STRENGTH METER CIRCUITRY

BACKGROUND OF THE INVENTION

In the prior art it has been a common practice to employ a signal strength meter to indicate the strongest signals attainable. It would appear that such an indication would provide the very best receivable signal and, as a result, the very best audio result.

However, it has been found that the above-mentioned desirable audio result is not necessarily obtained even though the maximum receivable signal is utilized. More specifically, strong received signals are often polluted with undesired noise signals which are undistinguishable from the received signal in most of the knwon signal strength meter apparatus. Thus, known signal strength meter apparatus often includes a peak detector which responds to an excessively strong signal having an accompanying unknown quantity of noise in a manner which causes an excessive deflection of the meter. Alternatively, a small received signal normally causes a minimal ro an undistinguishable amount of meter deflection which is obviously undesirable.

OBJECTS AND SUMMARY OF THE INVENTION

An object of the present invention is to provide enhanced signal strength meter circuitry for a signal receiver. Another object of the invention is to provide improved signal strength meter circuitry having a visual indication substantially immune to undesired noise in the received signal. Still another object of the invention is to utilize the noise content of a received signal to provide an indication of the strength of the received signal. A further object of the invention is to utilize noise in received signals below a given level to indicate signal strength and the received signal above the given level to provide the signal strength indication.

These and other objects, advantages and capabilities are achieved in one aspect of the invention by signal strength meter circuitry wherein a signal strength meter is coupled to a substantially fixed potential source which is, in turn, coupled by a noise signal detection means to the detector stage of a signal receiver. Also, the signal strength meter is coupled to an IF amplifier stage of the signal receiver by means responsive to received signals above a given level.

BRIEF DESCRIPTION OF THE DRAWINGS

FIG. 1 is a diagram, in block form, illustrating a signal strength metering circuit for a signal receiver; and FIG. 2 is a diagram, in block and schematic form, illustrating a more specific embodiment of the metering circuit of FIG. 1.

PREFERRED EMBODIMENT OF THE INVENTION

For a better understanding of the present invention, together with other and further objects, advantages and capabilities thereof, reference is made to the following disclosure and appended claims in connection with the accompanying drawings.

Referring to the drawings, the block diagram of FIG. 1 illustrates a signal strength metering circuit in the environment of a signal receiver. Herein, an antenna 5 for intercepting transmitted signals is coupled to a tuner stage 7 having the usual radio frequency (RF) amplifier and mixer and local oscillator stages. This tuner stage 7 provides an IF signal which is applied to an IF amplifier and detector stage 9 wherein signals at an audio frequency are developed and utilized in the usual manner in a signal receiver.

Coupled to the IF amplifier and detector stage 9 is an RF detector stage 11 wherein a DC voltage is developed in response to signals from the IF amplifier and detector stage 9 resulting from received signal above a given signal level. This DC voltage developed in the RF detector stage 11 is coupled to a signal strength meter 13 to effect a deflection thereof. Also, the developed DC voltage is coupled back to the tuner stage 7 to provide a desired automatic gain control (AGC) of the tuner stage 7.

A noise amplifier and detector stage 15 couples the output of the IF amplifier and detector stage 9 to the signal strength meter 13. This noise amplifier and detector stage 15 is arranged to provide an approximate half-scale deflection of the signal strength meter 13 and in response to received signals below a given level provides a DC potential which reduces the half-scale deflection of the signal strength meter 13 in an amount inversely proportional to the strength of the received signal.

In a more specific embodiment, FIG. 2 illustrates a signal receiver having an antenna 17 coupled to a tuner stage 19 which is, in turn, coupled to an IF amplifier stage 21. An FM detector stage 23 is coupled to the IF amplifier stage 21 and provides signals at audio frequencies suitable for use in signal receivers in a normal and well-known manner.

An RF amplifier stage 25 and RF rectifier stage 27 series couple the IF amplifier stage 21 to a signal strength meter 29. Also, a noise amplifier stage 31 and noise rectifier stage 33 series couple the detector stage 23 to the signal strength meter 29.

More specifically, the RF amplifier stage 25 includes a transistor 35 having an emitter coupled to circuit ground by a parallel coupled resistor 37 and capacitor 39. The base of the transistor 35 is coupled to a junction 41 of a pair of resistors 43 and 45 series connected across a potential source B+ and circuit ground and by way of a capacitor 47 to the IF amplifier stage 21. The collector of the transistor 35 is coupled to the potential source B+ by way of a parallel coupled inductor 49 and first and second capacitors 51 and 53. Also, a third capacitor 55 couples the collector of the transistor 35 to the junction 57 of a first and second diode 59 and 61.

The first diode 59 is connected to circuit ground. The second diode 61 is connected to circuit ground by a capacitor 63 and to the junction of first and second series connected resistors 65 and 67. The first resistor 65 is coupled by a resistor 69 to the potential source B+ and by another resistor 71 to the tuner stage 19 of the signal receiver. The second resistor 67 is coupled to circuit ground by a capacitor 73 and to the signal strength meter 29.

Also, the noise amplifier stage 31 includes a transistor 75 having an emitter coupled to circuit ground by a parallel connected resistor 77 and capacitor 79. The base of the transistor 75 is coupled to the junction 81 of first and second resistors 83 and 85 series connecting the potential source B+ to circuit ground and by way of a capacitor 87 to the detector stage 23. The collector of the transistor 75 is coupled to the potential source B+ by a frequency selective parallel coupled inductor 89 and capacitor 91 and to the junction 93 of the noise rectifier stage 33, and a noise rectifier stage 34.

The noise rectifier stage 33 includes a capacitor 97 coupled by a diode 99 and shunting resistor 101 to the potential source B+. The shunting resistor 101 is also coupled to circuit ground by a series connected resistor 103 and a diode 105 shunted by a capacitor 107. The junction 109 of the series connected resistor 103 and diode 105 is coupled to the signal strength meter 29.

Also, the mute and stereo switching circuit 95 includes the noise detector 34 consisting of capacitor 111 and diode 113 series connecting the junction 93 to circuit ground. An automatic-defeat switch 115 couples the junction of the capacitor 111 and diode 113 to first and second pairs of series connected resistors 117 and 119 and 121 and 123 parallel coupled to the potential source B+. The junction of the first pair of series connected resistors 117 adn 119 is coupled to circuit ground by a capacitor 125 and to a mute circuit of the signal receiver. Similarly, the junction of the second pair of resistors 121 and 123 is coupled to a stereo switching means and to circuit ground by another capacitor 127.

As to operation, a received signal intercepted by the antenna 17 is applied to the tuner 19 wherein is developed IF signals which are applied to the IF amplifier stage 21. In turn, the amplified IF signals are applied to an FM detector stage 23 wherein audio signals are developed for the signal receiver. Also, the FM detector stage 23 provides a noise signal which is inversely proportional to the received signal level input to the detector stage 23.

For signal levels, in the range of about 1.0 to 100.0 u-volts for example, the noise signals available from the detector stage 23 are applied to the noise amplifier stage 31. Therein, the noise signals are amplified, frequency selected by the tuned circuit of the parallel connected inductor 89 and capacitor 91 for a signal of about 100 kHz for example, and applied to the noise rectifier stage 33. Therein, the amplified and selected noise signal is rectified by the diode 99, filtered by the resistor 103 and capacitor 107, and applied to one side of the signal strength meter 29.

Also, a substantially fixed potential is provided at the junction 109 by the resistors 101 and 103 connected in series to the potential source B+. This relatively fixed potential is also applied to the signal strength meter 29 to effect a substantially half-scale deflection thereof whenever there is no rectified noise signal present. Moreover, this substantially half-scale deflection of the signal strength meter 29 is reduced by an amount proportional to the amount of noise signal present. Thus, the signal strength meter 29 presents a deflection in an amount proportional to a received signal, when the received signal is below a given signal level, by deduction of meter deflection in an amount proportional to noise signals from a fixed meter deflection. Diode 105 prevents negative meter readings when rectified noise voltage generated by the noise rectifier circuit 33 exceeds the reference B+ voltage thus avoiding any restrictions on maximum noise level generation by the noise amplifier stage 31. Further, when the received signal is above a given signal level, a portion of the signal available from the IF amplifier stage 21 is applied to and amplified by the RF amplifier stage 25. This amplified signal is selected by a tuned circuit having a narrow bandwidth and including the inductor 49, capacitor 51, and capacitor 53. This amplified and selected signal is applied to the RF rectifier stage 27 including the voltage doubler of diodes 59 and 61 and provides a DC potential. This DC potential which requires a signal strength above a given level at the IF amplifier stage 21, above 100 u-volts for example, is applied to the signal strength meter 29 to effect deflection thereof when relatively strong signals are received.

Additionally, this DC potential developed by the voltage doubler or RF rectifier stage 27 is also applied as an AGC potential to the tuner stage 19. Thus, the range of the signal strength meter 29 is further enhanced by utilizing the relatively strong received signals to effect automatic gain control of the signal receiver.

Thus, there has been shown and described a unique signal strength metering circuit for a signal receiver. The circuitry not only employs a noise signal inversely proportional to received signals below a given level for effecting deflection of the signal strength meter but also utilizes received signals above a given signal level to further effect deflection of the signal strength meter. Moreover, the received signals above the given signal level are further employed as a source of AGC potentials for enhancing operation of the signal tuner stage of the signal receiver.

While there has been shown and described what is at present considered the preferred embodiment of the invention, it will be obvious to those skilled in the art that various changes and modifications may be made therein without departing from the invention as defined by the appended claims.

What is claimed is:

1. In a signal receiver which includes connected intermediate frequency (IF) amplifier and detector stages, a signal strength metering circuit comprising:
   a signal strength meter;
   means for developing and applying a substantially constant potential to said meter to effect a given deflection;
   means coupled to said detector stage for developing a potential proportional to the noise portion of a received signal below a given level and for applying said potential to said signal strength meter to effect a proportionate reduction in said given deflection; and
   means coupled to said IF amplifier stage for developing a potential proportional to the received signal above said given level and for applying said potential to said signal strength meter to effect a proportionate increase in deflection of said meter.

2. The signal strength metering circuit of claim 1 wherein said means for developing and applying a substantially constant potential includes an impedance and a uni-directional conduction device coupled intermediate a potential source and a potential reference level.

3. The signal strength metering circuit of claim 1 wherein said means coupled to said detector stage for developing a potential proportional to the noise portion of a received signal includes a noise rectifier stage coupled to said means for developing and applying a substantially constant potential to said meter.

4. The signal strength metering circuit of claim 1 wherein said means coupled to said detector stage for developing a potential proportional to the noise portion of a received signal includes an amplifier stage coupled to said detector stage, a bandpass network coupled to said amplifier stage, a rectifier stage coupled to said bandpass network, and a filter network coupling said rectifier stage to said means for developing and applying a substantially constant potential to said meter.

5. The signal strength metering circuit of claim 1 wherein said means coupled to said IF amplifier stage includes a rectifier stage coupled to said signal strength meter.

6. The signal strength metering circuit of claim 1 including a rectifier stage in the form of a voltage doubler circuit coupling said IF amplifier stage to said signal strength meter.

7. The signal strength metering circuit of claim 1 including an amplifier stage coupled to said IF amplifier stage, a bandpass circuit coupled to said amplifier stage, and a rectifier stage coupling said bandpass circuit to said signal strength meter.

8. In a signal receiver having series connected radio frequency (RF), intermediate frequency (IF), and detector stages, a signal strength metering means comprising:

a meter for indicating signal strength;

means coupled to said IF amplifier stages and responsive to a received signal above a given level for developing a potential proportional to said received signal and for applying said potential to said meter;

fixed potential development means including a series conducted impedance and uni-directional conduction device coupled intermediate a potential source and a potential reference level with said impedance and uni-directional conduction device having a junction coupled to said meter; and means responsive to the noise portion of a received signal below said given level coupled to said detector stage and to said fixed potential development means whereby a potential provided by said fixed potential means is reduced by noise portion of said received signal below said given level and applied to said meter.

9. The signal strength metering means of claim 8 wherein said means coupled to said IF amplifier stage includes a rectifier stage in the form of a voltage doubler coupled to said meter.

10. The signal strength metering means of claim 8 wherein said means coupled to said detector stage includes a rectifier stage coupled to said fixed potential means.

11. The signal strength metering means of claim 8 including an automatic gain control (AGC) circuit coupling said means for developing a potential proportional to said received signal above a given level to said RF amplifier stages.

* * * * *